(12) United States Patent
Nagata et al.

(10) Patent No.: US 7,680,591 B2
(45) Date of Patent: Mar. 16, 2010

(54) NAVIGATION APPARATUS, POSITION INFORMATION REGISTRATION METHOD AND PROGRAM THEREOF

(75) Inventors: Koji Nagata, Tokyo (JP); Akira Sakamoto, Kanagawa (JP)

(73) Assignee: Sony Corporation (JP)

( * ) Notice: Subject to any disclaimer, the term of this patent is extended or adjusted under 35 U.S.C. 154(b) by 1010 days.

(21) Appl. No.: 11/175,056

(22) Filed: Jul. 5, 2005

(65) Prior Publication Data

US 2006/0020387 A1 Jan. 26, 2006

(30) Foreign Application Priority Data

Jul. 20, 2004 (JP) ............................ P2004-211245

(51) Int. Cl.
*G01C 21/00* (2006.01)
(52) U.S. Cl. ...................................... 701/207; 701/200
(58) Field of Classification Search .................. 701/35, 701/213, 200, 207
See application file for complete search history.

(56) References Cited

U.S. PATENT DOCUMENTS 6,340,935 B1 * 1/2002 Hall ........................ 340/932.2
6,407,698 B1 * 6/2002 Ayed ...................... 342/357.07
6,456,936 B1 * 9/2002 Neukirchen et al. .......... 701/213
2004/0107048 A1 * 6/2004 Yokota ....................... 701/211

FOREIGN PATENT DOCUMENTS

| JP | 07-063568 A | 3/1995 |
| JP | 2001-050760 A | 2/2001 |
| JP | 2001-330456 A | 11/2001 |
| JP | 2002-092782 A | 3/2002 |
| JP | 2002-340593 A | 11/2002 |

* cited by examiner

*Primary Examiner*—Mark Hellner
*Assistant Examiner*—Helal A Algahaim
(74) *Attorney, Agent, or Firm*—Lerner, David, Littenberg, Krumholz & Mentlik, LLP

(57) ABSTRACT

A navigation apparatus that includes a position information acquiring unit acquiring position information of a parking position; a parking information acquiring unit acquiring information as to a parking time in the parking position; and a memory storing the position information acquired by the position information acquiring unit when it is judged on the basis of the information as to the parking time acquired by the parking information acquiring unit that its parking time exceeds a predetermined time.

8 Claims, 5 Drawing Sheets

NAVIGATION APPARATUS, POSITION INFORMATION REGISTRATION METHOD AND PROGRAM THEREOF

BACKGROUND OF THE INVENTION

1. Field of the Invention

The present invention relates to a navigation apparatus and the like for displaying position information of a current position, and more particularly to a navigation apparatus that stores position information for future utilization, a method of registering position information, and a program thereof.

2. Description of Related Art

A car navigation apparatus is used as means for self-recognition of a current position of an automobile in running operation. The car navigation apparatus reproduces data, for example, from a DVD, a hard disk or the like which are media in which road map data is stored, and displays a road map indicating an area currently running on a screen, for example, of a liquid crystal display. Further, the car navigation apparatus can display a vehicle position to be successively measured by a GPS (Global Positioning System) making use of radio waves of artificial satellites, a gyroscope mounted on a vehicle and a vehicle speed pulse as being superimposed on a road map on the screen of the display. Moreover, the driver (user) can easily recognize a running position of his/her car by observing the position thereof displayed on the map.

When a destination is set, the car navigation apparatus searches a guide route from a current position to the destination, and displays the guide route in a color different from a normal road color on the display screen on which the road map is displayed. The car navigation apparatus is also able to carry out drive guidance to the destination by instructing the driver in voice a direction of his/her car to proceed along the guide route. When having such a car navigation apparatus to carry out drive guidance to a destination, the user manually designates the destination in the car navigation apparatus. Upon such designation, the car navigation apparatus automatically searches a shortest route to the destination, and displays it on the screen.

Published Japanese Patent Application (KOKAI) No. 2001-330456 (pp. 5-6, FIG. 4) discloses a car navigation apparatus which is provided, for example, with guide mark utilization status analysis means for analyzing and evaluating a frequency of utilization of a facility or the like which is determined on the basis of the position information of one's car from a GPS receiver and the current status of one's car, and indicated by guide mark data stored in a map information database, so as to produce guide mark utilization frequency evaluation data. According to this technology, if the frequency of use of a point where one desires to drop in on the way is high, it is taken into consideration during a route search. That is to say, it is able to search a route to the destination in accordance with the guide mark utilization frequency evaluation data generated by this guide mark utilization status analysis means.

SUMMARY OF THE INVENTION

However, when the driver wants to visit once again the place he/she happened to visit (park) in the past, it is necessary to have trouble to manually input the place he/she visited or parked. Further, in a case where the driver does not remember the place precisely, the driver will have to recall it following his/her memory, which is intricate and troublesome.

The present invention is contemplated to solve the aforementioned technical problem, and is made in consideration of demand for a novel navigation apparatus that is able to dispense with the manual inputting by the user of the place previously parked, a method for registering position information, and a program thereof.

A navigation apparatus according to an embodiment of the present invention is configured to automatically register a position in a case where a predetermined parking state is entered and if its parking time is substantially long, thereby allowing an automatic registration only of useful information to the user. That is to say, position information acquiring means acquires position information of a parking position, and parking information acquiring means acquires information as to a parking time in the parking position. And, memory means stores the position information acquired by the position information acquiring means when it is judged from the information as to the parking time acquired by the parking information acquiring means that its parking time exceeds a predetermined time.

Search means searches frequencies of storage of position information per each position information stored in the memory means. Further, the memory means stores information as to the parking time together with the position information of the parking position, and the search means searches position information on the basis of the information as to the parking time thereof.

According to a method for registering position information according to another embodiment of the present invention, position information of a vehicle is detected in a position information detecting step, and a parking time of the vehicle is measured in a measuring step. Subsequently, in a judgment step, whether or not to register the position information detected in the position information detecting step is judged on the basis of duration of the parking time measured in the measuring step. Then, the position information that was judged to be registered in the judgment step is registered in a registration step.

The measuring step is preferably configured to measure a parking time as an elapsed time from OFF to ON of an accessory power supply of the vehicle. Alternatively, the measuring step may be configured to measure an elapsed time from activation of a parking brake of the vehicle until release thereof as the parking time.

Further, the judgment step may be configured also such that when the parking time measured in the measurement step does not reach a first threshold value, it is judged that the position information is not registered, and when the parking time reaches a second threshold value which is greater than the first threshold value, it is judged that the position information is registered. And, when the parking time reaches the first threshold value and does not reach the second threshold value, whether or not to register the position information is confirmed with the user in a confirmation step.

Further, a program according to still another embodiment of the present invention is for implementing a computer unit for obtaining position information of a vehicle to realize a parking information acquisition function for acquiring information regarding a parking time at a parking position of the vehicle, and a memory function for storing position information of the parking position in a case where the parking time is judged to have exceeded a predetermined time from the information regarding the parking time obtained by the parking information acquisition function.

According to the present invention, because the position information of a parking position of a vehicle is automatically registered if a parking time exceeds a predetermined time, advantageously, a user is liberated from manual entry of the parking positions where he/she has ever stopped the vehicle.

DETAILED DESCRIPTION OF PREFERRED EMBODIMENTS

By referring to the accompanying drawings, embodiments of the present invention will be described in detail in the following.

Figure 1:
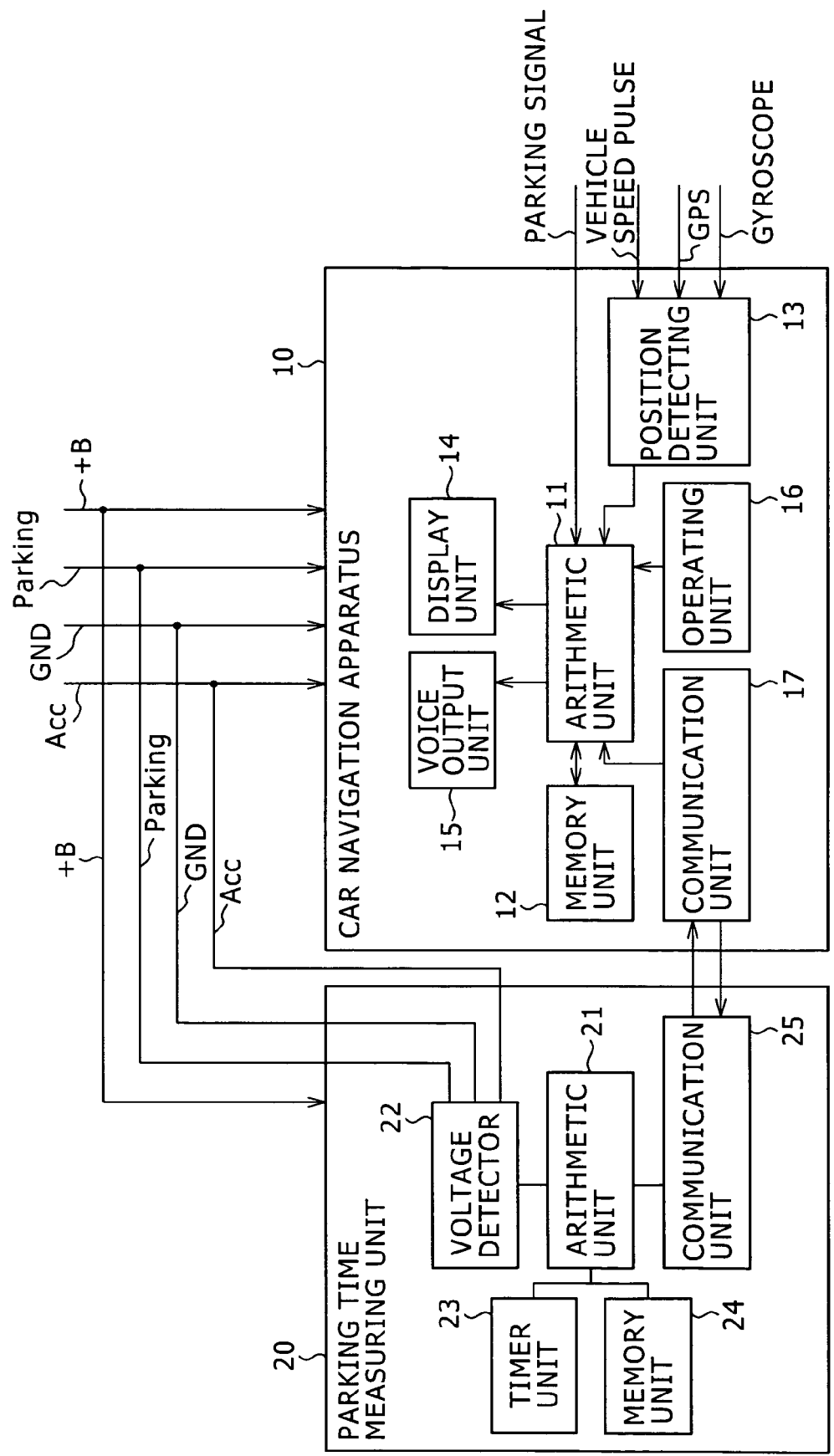
FIG. 1 is a block diagram showing a car navigation apparatus and a parking time measuring unit.

FIG. 1 is a block diagram showing a car navigation apparatus 10 and a parking time measuring unit 20 as an in-vehicle computer apparatus. The car navigation apparatus 10 mounted in the vehicle is supplied with various power supplies and signals, such as an accessory power supply (Acc), parking signal (Parking) and the like, from the vehicle. Also, to the parking time measuring unit 20, power supplies and signals, such as the accessory power supply (Acc) or the like, are supplied from the vehicle. The car navigation apparatus 10 and the parking time measuring unit 20 are allowed to transmit/receive signals mutually.

The car navigation apparatus 10 includes an arithmetic unit (memory means, search means) 11 which controls overall operation, a memory unit (memory means) 12 which carries out data communication with the arithmetic unit 11, and a position detecting unit (position information acquiring means) 13 which detects a position of the vehicle and outputs it to the arithmetic unit 11. The car navigation apparatus 10 further includes a display unit 14 for displaying map information and the like processed by the arithmetic unit 11, a voice output unit 15 for outputting a voice guide, an operating unit 16 for the user to instruct various functions to be operated or the like, and a communication unit (parking information acquiring means) 17 for carrying out communication with the parking time measuring unit 20.

The memory unit 12 for storing map information, facility data associated therewith and the like comprises large capacity storage such as an optical disc apparatus, a magnetic disk apparatus or the like. Further, the memory unit 12 includes a RAM functioning as an internal memory device composed of a DRAM (Dynamic Random Access Memory) or the like, and a ROM (Read Only Memory) for storing a program for causing the arithmetic unit 11 to carry out a predetermined processing. By way of example, the facility data is configured to include information relating to various stores such as retail shops, department stores, restaurants and the like, or residence, condominium buildings and place names, in addition to facilities such as a station or the like, leisure facilities, accommodations, and other public facilities. This facility data includes data such as telephone numbers, addresses, latitudes and longitudes or the like of respective facilities. Further, this facility data also includes data for showing a land mark or the like representative of the facility, which is to be superimposed on road information displayed on the display unit 14.

A position detecting unit 13 is for detecting a current position of one's car on the basis of radio waves received from GPS satellites, and outputting it to the arithmetic unit 11. Further, when a position detection using the GPS satellites is not possible, for example, in a tunnel or the like, the position detecting unit 13 is able to detect the position of the car also by autonomous position sensing using at least either one of a signal from a gyroscope and a car speed sensing pulse.

The display unit 14 which is composed of, for example, a liquid crystal display is for displaying the position information of one's car obtained by the position detecting unit 13, by superimposing on map information stored in the memory unit 12 so as to show the user the current position. The voice output unit 15 is for outputting voice guide at the time of executing route guidance. The operating unit 16 which includes a mechanical switch (not shown) provided in the vicinity of the display unit 14 and a touch panel (not shown) to be provided in the screen of the display unit 14 enables for the user to carry our various inputs including instruction of executing various functions, designation of a destination or the like, and selection of a scale of road maps to be displayed on the display unit, by making use of these switches or the like. In this case, a remote controller (not shown) is also configured to carry out functions equivalent to this switch and the like.

Here, the car navigation apparatus 10 is supplied with a constant power supply (+B), an accessory power supply (Acc), and a parking signal (Parking) from the vehicle. Further, the car navigation apparatus 10 is connected to ground (GND). It is noted that the constant power supply (+B) constantly supplies 12V irrespective of positions of an ignition key of the vehicle, and the accessory power supply (Acc) is supplied only when the ignition key is positioned at "Acc" or further in the key cylinder (not at "Lock" position).

Further, the parking signal (Parking) is for detecting whether or not a parking brake (not shown) is activated, and is supplied to the arithmetic unit in order to correspond to a function which is restricted to operate unless the parking brake is activated for the sake of safety. In addition, the parking signal (Parking) is also for illuminating a parking lamp within an instrumental panel (not shown).

The parking time measuring unit 20 has an arithmetic unit 21 for controlling overall operation thereof, a voltage detecting unit 22 for detecting whether or not the constant power supply (+B) and the accessory power supply (Acc) are supplied to the car navigation apparatus 10, a timer unit 23 for measuring time in response to an instruction from the arithmetic unit 21, a memory unit 24 which communicates data with the arithmetic unit 21, and a communication unit 25 for carrying out communication with respect to the car navigation apparatus 10. Further, the parking time measuring unit 20 is supplied with the constant power (+B) from the vehicle, and is connected to the ground (GND). The voltage detecting unit 22 also detects a parking signal (Parking).

Figure 2A:
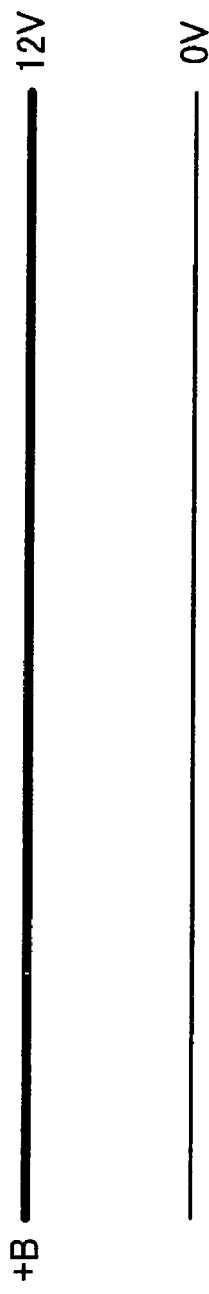
FIG. 2A to FIG. 2C are graphs each showing states of detection by a voltage detecting unit in the parking time measuring unit, in which the vertical axis shows voltage and the horizontal axis shows time.
Figure 2B:
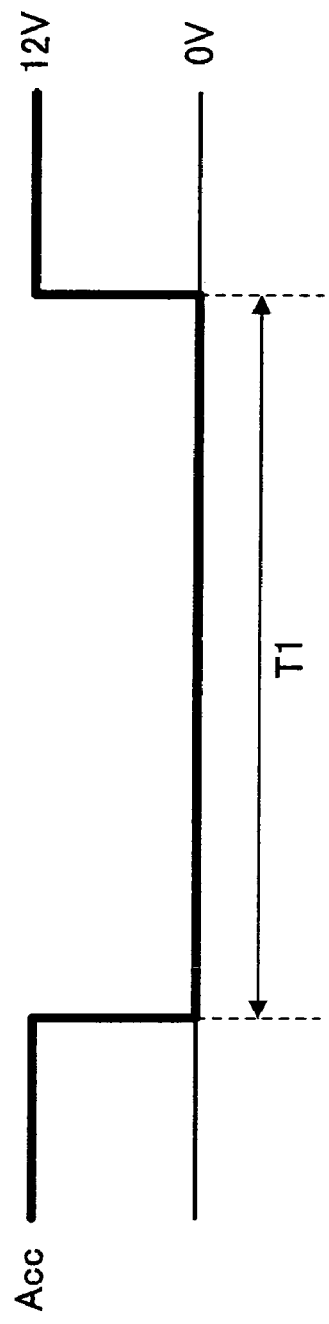
Figure 2C:
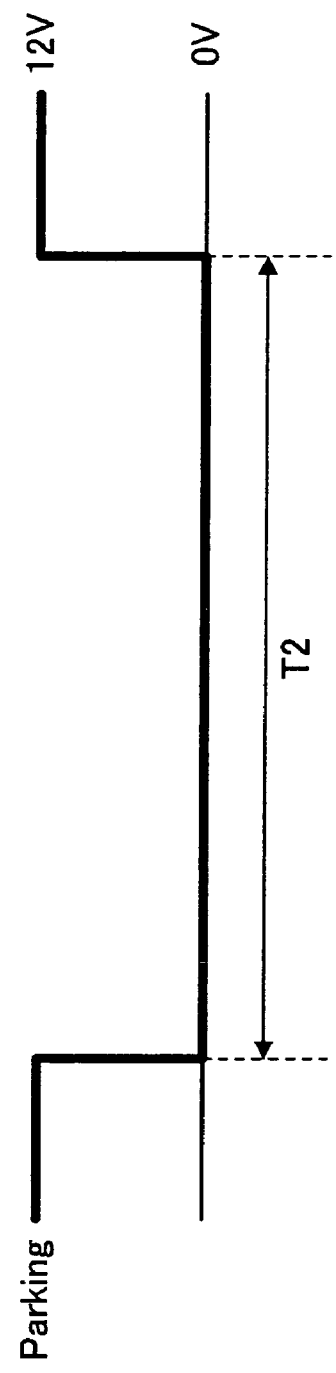

Here, FIG. 2A to FIG. 2C are graphs each showing voltages detected by the voltage detecting unit 22 in the parking time measuring unit 20. FIG. 2A shows a voltage of the constant power supply (+B), FIG. 2B shows a voltage of the accessory power supply (Acc), and FIG. 2C shows a voltage of the parking signal (Parking), where the vertical axis shows the voltage and the abscissa shows the time.

The voltage detecting unit 22 in the parking time measuring unit 20, as shown in FIGS. 2A-C, detects always 12V as to the constant power supply (+B) (refer to FIG. 2A), and detects 12 V only in cases where the ignition key is positioned at "Acc" or further in the key cylinder (not at "Lock" position), and 0 V in other cases as to the accessory power supply (Acc) (refer to FIG. 2B). Further, as to the parking signal (Parking), it detects 12 V when the parking brake is activated, and 0 V when the parking brake is not activated (refer to FIG. 2C).

In the parking time measuring unit 20 configured as describe above, when the voltage detecting unit 22 detects that the accessory power (Acc) supplied from the vehicle becomes OFF, a signal thereof is transmitted to the arithmetic unit 21. Upon reception of the signal, the arithmetic unit 21 instructs a timer unit 23 to start counting of time. Subsequently, when the voltage detecting unit 22 detects that the accessory power (Acc) becomes ON, and sends a signal thereof to the arithmetic unit 21, the arithmetic unit 21 instructs the timer unit 23 to terminate the counting of time, and enables the memory unit 24 to store a measured time T1 (refer to FIG. 2B). Further, the measured time T1 is transmitted as a parking time via the communication unit 25 to the communication unit 17 in the car navigation apparatus 10.

In the car navigation apparatus 10, the arithmetic unit 11 that has received the parking time via the communication unit 17 is enabled to change contents of subsequent processing depending on a length of the parking time.

Now, steps of automatic registering of positions will be described by referring to FIG. 3.

Figure 3:
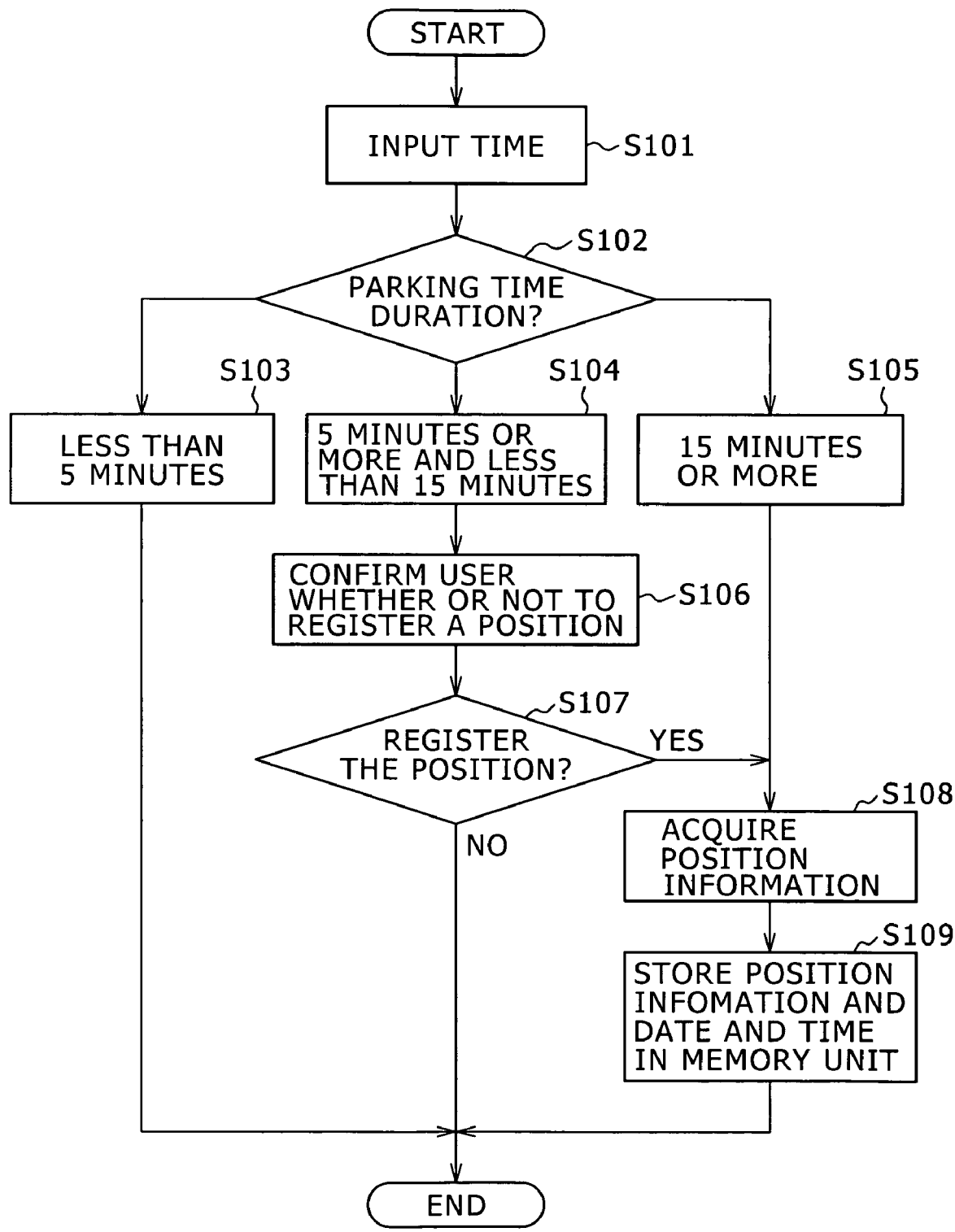
FIG. 3 is a process flowchart to be executed by an arithmetic unit in the car navigation apparatus.

FIG. 3 is a process flowchart to be executed by the arithmetic unit 11 in the car navigation apparatus 10. When a parking time is entered from the parking time measuring unit 20 (S101), the arithmetic unit 11 judges if the parking time corresponds to a period of time which is less than 5 minutes, a period of time which is 5 minutes or more and less than 15 minutes, or a period of time which is 15 minutes or more (S102). As described above, the arithmetic unit 11 judges the necessity of automatic registration of a parking position depending on a length of the parking time. That is to say, contents of the subsequent processing are varied from a viewpoint that necessity of automatic registration of the parking position is low if the parking time is short; conversely necessity of the automatic registration becomes higher if the parking time becomes longer.

If the parking time is less than 5 minutes, the flow terminates without registering the parking position (S103). If the parking time is 5 minutes or more and less than 15 minutes (S104), it is displayed on a display unit 14 whether or not to register the parking position for confirmation (S106), waiting for an instruction from the user (S107). When it is instructed from the user to make registration via the operating unit 16, point information (position information) is obtained from the position detecting unit 13 (S108), and the memory unit 12 stores the position information in association with the time and date thereof (S109), then the process terminates. If in S107 it is instructed by the user not to register, the process terminates as it is. If the parking time is 15 minutes or more (S105), without confirmation of the user whether or not to register the parking position, position information is obtained (S108), and the memory unit 12 is enabled to store the position information in association with the time and date (time information relating to the parking) (S109), then the process terminates.

It is noted that the position information to be stored may also include addresses, in addition to the longitude and latitude of the parking position. Of course, it may be configured also such that only the latitude and longitude are stored at the time of display, and an address corresponding to the latitude and longitude is read out from the memory unit 12 to be displayed.

As described above, if the parking time is short, the parking position thereat is not useful for the user, therefore, it is meaningless to automatically register the position. That is to say, automatic registration of information regarding such parking position is considered rather to cause waste of a quantity of data corresponding thereto, therefore, it is configured so that such parking position is excluded from the automatic registration target.

For example, if a position where a car is parked and the ignition key is turned off is in the site of a convenience store, it may be considered that a user merely dropped in for shopping, thereby automatic registration is not necessary for the user. Such shopping may be expected to be finished normally within 5 minutes. Granting it takes more than 5 minutes, if it is less than 15 minutes, automatic registration will not be executed before confirmation by the user whether or not to register the position, thereby preventing automatic registration of meaningless places to the user.

On the other hand, in a case where a position where the car is parked and the ignition key is turned off is, for example, a pottery shop, where they dropped in by chance without a previous plan, if the user (driver) and/or a passenger find many items of interesting pottery, or if they actually practice pottery work and baking by themselves, the time of their stay will become long, thereby worth of automatic registration is considered to increase. Once the shop is automatically registered, the user can easily find the way to the shop when the user tries to visit it again afterwards. By carrying out the automatic registration as described above, it becomes possible to save his/her trouble of manually registering by the user himself/herself, and to improve ease of use to the user. Any place where the car is parked beyond a predetermined time period is ensured to be recorded.

Further, the time and date to be stored in the memory unit 12 in association with the position information includes a parking start time in addition to the parking time. The position information which was stored in the memory unit 12 in accordance with the flowchart described above is configured to be distinguishable from other position information which was stored irrespective of the aforementioned flowchart, for example, by changing storage regions therebetween.

In the next, browsing of information which was automatically registered will be described by referring to FIGS. 4 to 6.

Figure 4:
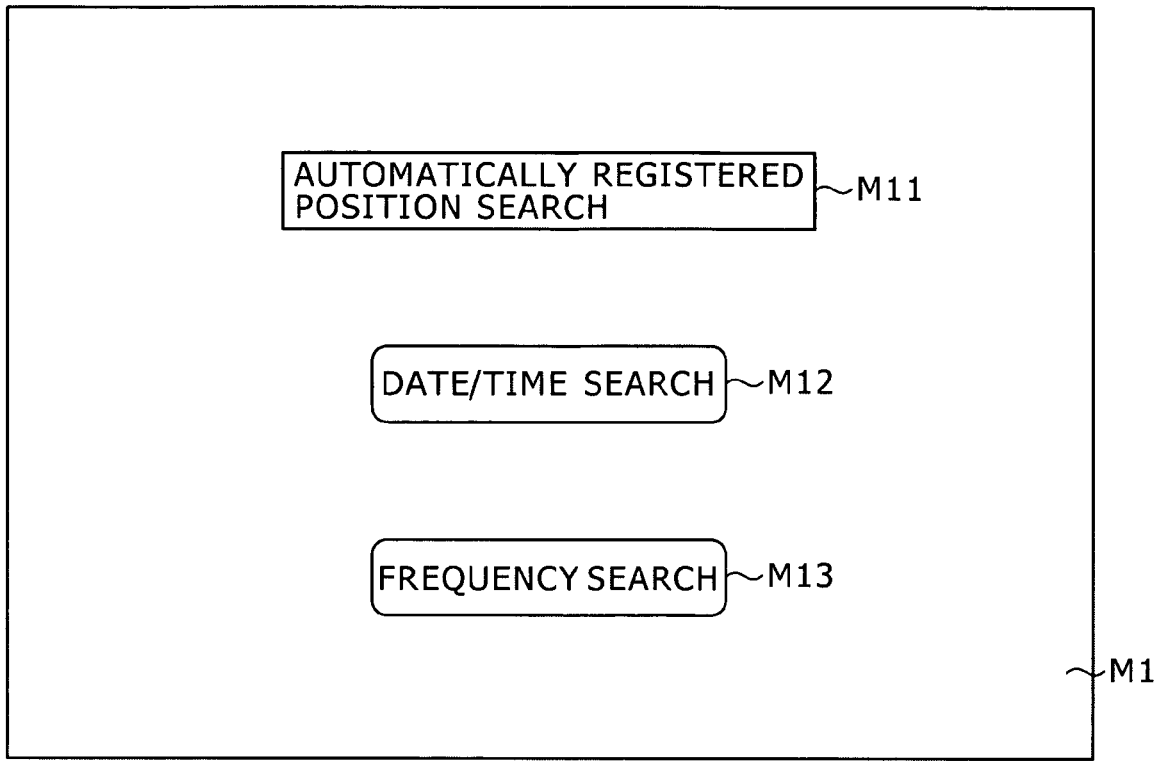
FIG. 4 is a diagram showing a display screen of a display unit of the car navigation apparatus.
Figure 5:
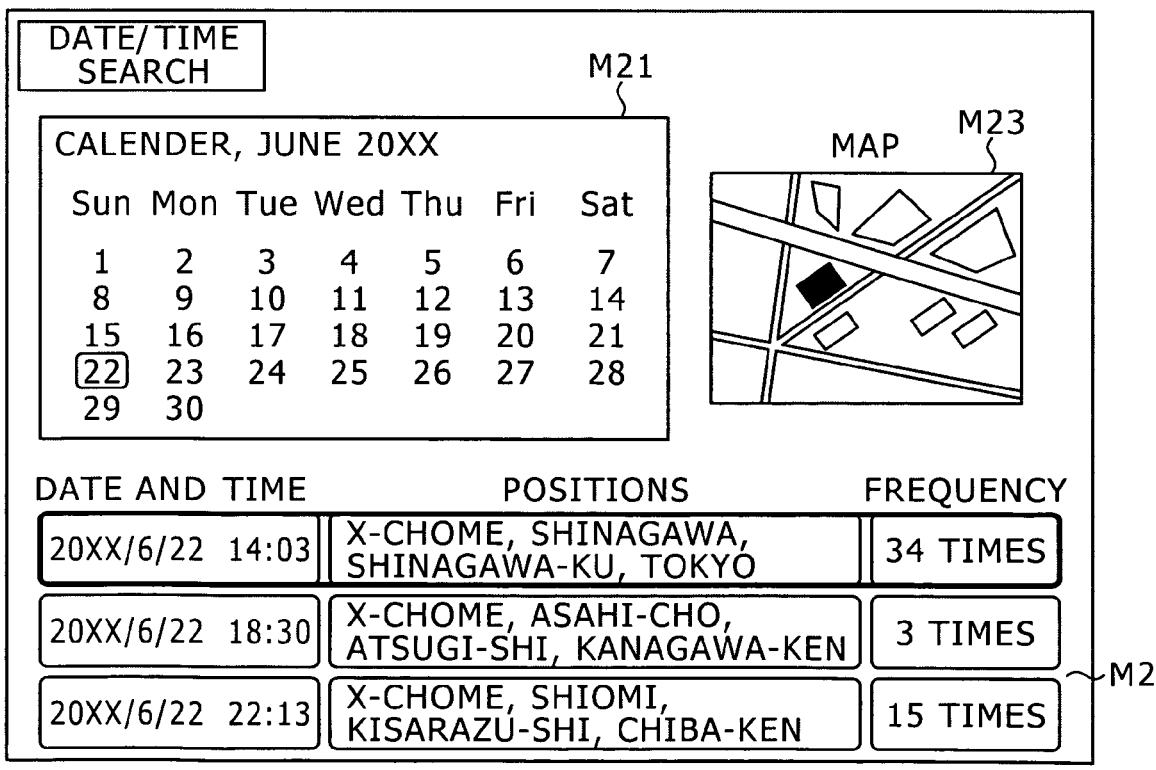
FIG. 5 is a diagram showing another display screen of the display unit of the car navigation apparatus.
Figure 6:
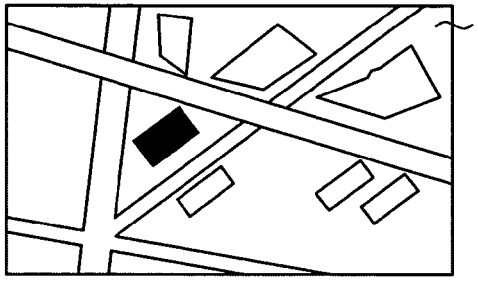
FIG. 6 is a diagram showing a still another display screen of the display unit of the car navigation apparatus.

FIGS. 4 to 6 show a display screen of the display unit for the car navigation system. More specifically, FIG. 4 is a menu screen M1 for an automatically registered position search, FIG. 5 shows a screen M2 when a date/time search based on the time and date is selected from the menu screen, and FIG. 6 shows a screen M3 when a frequency search based on frequencies is selected from the menu screen.

When the automatically registered positions search is selected with the operating unit 16 in the car navigation apparatus 16, the menu screen M1 as shown in FIG. 4 is displayed in the display unit 14. The menu screen M1 has a character block M11 indicating the automatically registered position search, and M12 indicating the date/time search and M13 indicating the frequency search, as items to be selected.

When the date/time search M12 is selected in the menu screen M1, a screen M2 including a calendar area M21, a search result display area M22 and a map area M23 is displayed in the display unit 14 as shown in FIG. 5. The calendar area M21 is shown in a monthly calendar format including days of the week (indication of Sunday to Monday).

When a date is selected from the monthly calendar in the calendar area 21, the places visited on this date are displayed in time sequence together with total number of times of past visits in the search result display area M22. That is, the order of arrangements in each line shows, from the left to the right, the date and time, the place (address), and a total number of times (frequency). The total number of times indicates how many times the user has visited the place in the past.

By way of example, as to the places to be displayed, in addition to displaying the address thereof, if the name of facilities corresponding to the address (for example, the name of a restaurant) is registered in advance, it may be considered also to display the name of this facility. Further, with respect to the total number of times to be displayed, in a case where a parking point changes, for example, in the site of the same restaurant, although latitude and longitude of the parking point as position information changes, if they are in close proximity, the parking point is judged to be the same position and the case is included in the total frequency.

When a position displayed in the search result display area M22 is selected, a map including the position is displayed in the map area M23. When displaying such a map in the map area M23, it is considered to render a target position become more perceptible to the user. That is, it may be considered that a target position is displayed in the center, the position is flickered, or that only this position is displayed in a different color, or the like.

By way of example, in the calendar area M21, it may be arranged also such that a yearly calendar is displayed at first, then by designating a specific month, a monthly calendar is displayed, and followed by designation of a specific date.

Further, when the frequency search M13 is selected in the menu screen M1 shown in FIG. 4, a screen M3 including a search result display area 31 and a map area M32 is displayed in the display unit 14, as shown in FIG. 6. More specifically, data are displayed in the order of frequencies in the search result display area 31. Although items to be displayed are the same as those in the case of FIG. 5, display positions thereof are different. That is, the order of arrangements in each line is, from the left to the right, the total frequency (the number of times), the position (address) and the date and time.

When a position displayed in the search result display area M31 is selected, a map including the position is displayed in the map area M32.

As described hereinabove, according to the embodiment of the present invention, by setting two threshold values, the time is enabled to be divided into a time domain where automatic registration is not executed, a time domain where automatic registration is executed, and an intermediate time domain. And, in the intermediate time domain, decision-making whether to carry out automatic registration or not is entrusted to the user. If all of the positions that the car has parked are automatically registered, the quantity of data will become excessively large, and it becomes indiscernible for the user to find a specific point already registered. Therefore, by providing the time domain where automatic registration is not applied and the time domain where confirmation by the user is required, superfluous positions are ensured not to be included. Further, it is enabled for the user easily to search through the contents of the points (positions) which were automatically registered.

In the next, the following examples of modifications of the aforementioned embodiment of the present invention will be contemplated.

For example, assuming that the period of time T2 (refer to (c) in FIG. 2) from the time the parking brake is activated until the time the parking brake is released is a parking time, a case may be considered where the processing is carried out along the flowchart of FIG. 3. In this case, irrespective of the accessory power supply (Acc), even if the engine is running, if the state of the parking brake being activated sustains for a long while, this point is automatically registered. For example, when a commercial car is routing clients, the position of a client may be automatically registered merely by activating the parking brake, thereby substantially improving the ease of use.

Further, it may be also considered of course that judgment whether to automatically register or not is made in combination of an elapsed time of the accessory power supply (Acc) changing from OFF to ON and an elapsed time of the parking brake from being activated to released.

For example, in a case where the driver drops in a souvenir shop by chance, and only some of passengers got off the car while the other passengers stayed inside the car, it may be expected to park the car without turning off the engine to keep its air-conditioner on. On the other hand, if simply the elapsed time of the parking brake from being activated until being released is defined as the parking time, for the user (driver) who happens to wait in traffic congestion with the parking brake activated, useless position information is automatically registered, thereby degrading the ease of use.

Therefore, it is allowed for judgment whether or not to carry out automatic registration to be made in conjunction with the above two. In this case, if the elapsed time of the parking brake from being activated to released becomes longer than a predetermined time, it may be conceivable to confirm the user regarding the necessity of registration of the position.

Further, as another modification of the present invention, a case of decision making may be conceivable whether or not to execute automatic registration as a parking time for such a period of time when a vehicle speed pulse is zero or when no change in the position of one's car detected by the navigation apparatus is observed. Alternatively, a case of decision making whether or not to execute automatic registration as a parking time may also be considered for such a period of time when a shift lever is positioned at PARKING in an automatic transmission car.

Further, in the aforementioned embodiment of the present invention, it may also be arranged such that respective threshold values of the time domains in which the automatic registration is not applied, the time domain in which the automatic registration is applied and the intermediate time domain therebetween are enabled to be set up arbitrarily by the user. Moreover, it may also be arranged to arbitrarily select only two from these three time domains. That is to say, it may be configured such that without providing the intermediate time domain, only the time domain where automatic registration is not applied and the time domain where automatic registration is applied are provided; without providing the time domain where automatic registration is not applied, only the intermediate time domain and the time domain where automatic registration is applied are provided; or without providing the time domain where automatic registration is applied, only the time domain where automatic registration is not applied and the intermediate time domain are provided.

Still further, it may also be arranged such that the threshold value for the intermediate time domain is automatically varied by a learning function provided to the arithmetic unit 11 in the car navigation apparatus 10. That is, by storing parking times for the positions that were registered and not registered after confirmation by the user as to the necessity of registration thereof, and threshold values are automatically varied depending on their tendency.

According to the preferred embodiment of the present invention described hereinabove, the parking time measuring unit 20 is provided separately from the car navigation apparatus 10, however, it may be configured also such that the parking time measuring unit 20 is incorporated within the car navigation apparatus 10.

Still further, it is also possible to configure such that the user can input additional information per item which was automatically registered, read out such additional information, and search on the basis of this additional information. Such additional information may include, for example, user's comments (memo) on that position, evaluation of facilities at the position, kinds of position (restaurant, friend's home, etc), names, the number and pictures of persons accompanied, or the like. If searching on the basis of such additional information is made possible, convenience of search will be improved further.

Still further, it may also be arranged to set one of the automatically registered facilities as a destination, to display the registered facility marked on a map, and to inform the user when approaching closer to the facility, or the like.

The present document contains subject matter related to Japanese Patent Application JP 2004-211245 filed in the Japanese Patent Office on Jul. 20, 2004, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation apparatus, comprising:
position information acquiring means for acquiring position information of a parking position;
parking information acquiring means for acquiring information as to a parking time in the parking position; and
memory means for storing the position information acquired by said position information acquiring means when the parking time acquired by said parking information acquiring means is equal to or greater than a second predetermined time value, for not storing the position information acquired by said position information acquiring means when the parking time acquired by said parking information acquiring means is less than a first predetermined time value which is less than the second predetermined time value, and for storing the position information acquired by said position information acquiring means when the parking time acquired by said parking information acquiring means is equal to or greater than the first predetermined time value and is less than the second predetermined time value and when a user provides an indication to store the respective position information,
in which the respective parking time or times which are equal to or greater than the first predetermined time value and less than the second predetermined time value are stored along with the respective indication or indications provided by the user, and
in which a value of a time domain associated with the parking time which is equal to or greater than the first predetermined time value and less than the second predetermined time value is automatically varied by a learning function by use of the stored respective parking time or times and respective indication or indications.

2. The navigation apparatus as claimed in claim 1, further comprising:
search means for searching frequencies of storage of position information per each position information stored in said memory means.

3. The navigation apparatus as claimed in claim 1, wherein:
said memory means stores the information as to the parking time together with the position information of the parking position, and said navigation apparatus further comprising:
search means for searching position information based on the information as to the parking time.

4. A position information registering method, comprising:
a position information detecting step of detecting position information of a movable vehicle by use of a position detecting unit;
a measuring step of measuring a parking time of the vehicle by use of a parking time measuring unit;
a judgment step of judging whether to register the position information detected in said position information detecting step based on a duration of the parking time measured in said measuring step by use of an arithmetic unit; and
a registration step of registering the position information judged to be registered in said judgment step,
said judgment step judges not to register the position information when the parking time measured in said measurement step does not reach a first threshold value, and to register the position information in a case when the parking time reaches a second threshold value which is greater than the first threshold value, and
the position information registering method further comprising a confirmation step of confirming with a user whether to register the position information when the parking time reaches the first threshold value and does not reach the second threshold value,
in which the respective parking time or times which are equal to or greater than the first threshold value and less than the second threshold value are stored along with respective confirmation or confirmations provided by the user, and
in which a value of a time domain associated with the parking time which is equal to or greater than the first threshold value and less than the second threshold value is automatically varied by a learning function by use of the stored respective parking time or times and respective confirmation or confirmations.

5. The position information registering method as claimed in claim 4, wherein:
said measuring step measures a parking time as an elapsed time from OFF to ON of an accessory power supply of the vehicle.

6. The position information registering method as claimed in claim 4, wherein:
said measuring step measures an elapsed time from activation of a parking brake of the vehicle until release thereof as the parking time.

7. A computer program stored on a storage medium which is executable by a computer apparatus for acquiring position information of a vehicle, said program comprising:
a parking information acquiring function that acquires information as to a parking time in a parking position of the vehicle, and
a memory function that stores the position information of the parking position when the parking time acquired by said parking information acquiring function is equal to or greater than a second predetermined time value, stores the position information when the parking time acquired by said parking information acquiring function is less than a first predetermined time value which is less than the second predetermined time value, and stores the position information when the parking time acquired by said parking information acquiring function is equal to or greater than the first predetermined time value and is less than the second predetermined time value and when a user provides an indication to store the respective position information, in which the respective parking time or times which are equal to or greater than the first predetermined time value and less than the second predetermined time value are stored along with the respective indication or indications provided by the user, and in which a value of a time domain associated with the parking time which is equal to or greater than the first predetermined time value and less than the second predetermined time value is automatically varied by a learning function by use of the stored respective parking time or times and respective indication or indications.

8. A navigation apparatus, comprising:

a position information acquiring unit configure to acquire position information of a parking position;

a parking information acquiring unit configure to acquire inquiring information as to a parking time in the parking position; and a memory unit configure to store the position information acquired by said position information acquiring unit when the parking time acquired by said parking information acquiring unit is equal to or greater than a second predetermined time value, for not storing the position information acquired by said position information acquiring unit when the parking time acquired by said parking information acquiring unit is less than a first predetermined time value which is less than the second predetermined time value, and for storing the position information acquired by said position information acquiring unit when the parking time acquired by said parking information acquiring unit is equal to or greater than the first predetermined time value and is less than the second predetermined time value and when a user provides an indication to store the respective position information, in which the respective parking time or times which are equal to or greater than the first predetermined time value and less than the second predetermined time value are stored along with the respective indication or indications provided by the user, and in which a value of a time domain associated with the parking time which is equal to or greater than the first predetermined time value and less than the second predetermined time value is automatically varied by a learning function by use of the stored respective parking time or times and respective indication or indications.

* * * * *